(12) United States Patent
Manier

(10) Patent No.: US 7,136,463 B1
(45) Date of Patent: Nov. 14, 2006

(54) TELEPHONE MESSAGE EXPORTING SYSTEM

(76) Inventor: Ricky Manier, 377 E. Home St., Rialto, CA (US) 92376

( * ) Notice: Subject to any disclaimer, the term of this patent is extended or adjusted under 35 U.S.C. 154(b) by 102 days.

(21) Appl. No.: 10/779,388

(22) Filed: Feb. 13, 2004

Related U.S. Application Data

(60) Provisional application No. 60/447,814, filed on Feb. 14, 2003.

(51) Int. Cl.
*H04M 11/00* (2006.01)
*H04M 1/60* (2006.01)
(52) U.S. Cl. .................... 379/88.14; 379/88.22
(58) Field of Classification Search ............. 379/88.14, 379/88.22
See application file for complete search history.

(56) References Cited

U.S. PATENT DOCUMENTS

| | | | | |
|---|---|---|---|---|
| 4,682,014 A | * | 7/1987 | Iwama | 235/375 |
| 4,727,567 A | * | 2/1988 | Angelini | 379/52 |
| 5,299,256 A | * | 3/1994 | Hu | 379/93.23 |
| 5,661,783 A | | 8/1997 | Assis | |
| 6,310,940 B1 | | 10/2001 | Ratz | |
| 6,342,901 B1 | | 1/2002 | Adler et al. | |
| 6,366,651 B1 | * | 4/2002 | Griffith et al. | 379/88.14 |
| 6,449,342 B1 | * | 9/2002 | Johanson | 379/88.11 |
| 6,917,670 B1 | * | 7/2005 | Isomura | 379/93.24 |

* cited by examiner

*Primary Examiner*—Wing Chan
*Assistant Examiner*—Simon Sing

(57) ABSTRACT

A telephone message exporting system for permitting exporting of collected messages to printed form or electronic form for later review by a user includes an answering machine having multiple telephone and answering machine features coordinated by a central processing unit. Programming converts digital messages into a printable form. A printer is provided to permit selective printouts of the messages left.

17 Claims, 3 Drawing Sheets

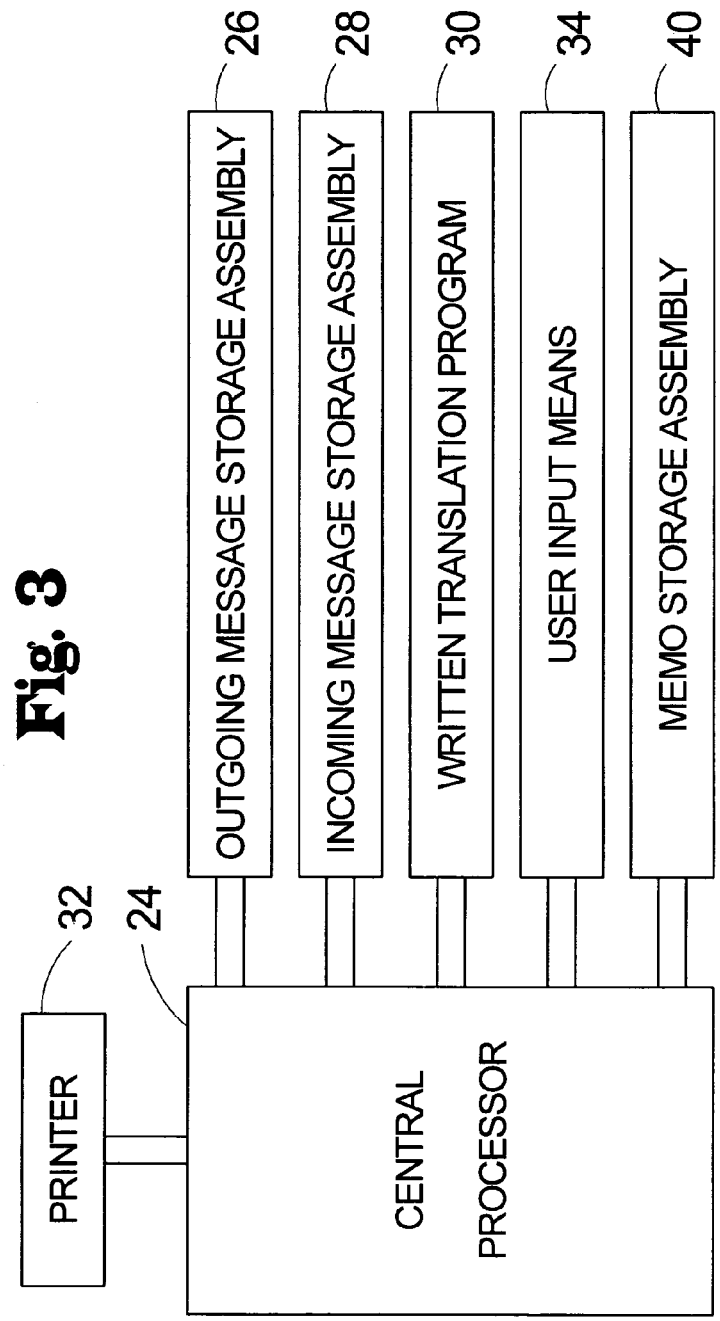

TELEPHONE MESSAGE EXPORTING SYSTEM

CROSS REFERENCE TO RELATED APPLICATION

This application claims the benefit of U.S. Provisional Application No. 60/447,814, filed Feb. 14, 2003.

BACKGROUND OF THE INVENTION

1. Field of the Invention

The present invention relates to telephone answering machines and more particularly pertains to a new telephone message exporting system for permitting exporting of collected messages to printed form or electronic form for later review by a user.

2. Description of the Prior Art

The use of telephone answering machines is known in the prior art. U.S. Pat. No. 5,661,783 issued to Assis on Aug. 26, 1997 describes a connection of several separate devices including a computer to digitize and display or print messages. Another type of communications machine is U.S. Pat. No. 6,342,901 issued to Adler et al. on Jan. 29, 2002 describes a networked parasitic user interface terminal to display information obtained through a communications link with a remote processor. U.S. Pat. No. 6,310,940 issued to Ratz on Oct. 30, 2001 discloses another networked phone system hard-wiring multiple telephones to a computer.

While these devices fulfill their respective, particular objectives and requirements, the need remains for a single device that works in a self-contained manner to produce written messages translated from incoming telephonic messages as desired by a user.

SUMMARY OF THE INVENTION

The present invention generally comprises an answering machine having multiple phone and answering machine features coordinated by a central processing unit. Programming converts digital messages into a printable form. A printer is provided to permit selective printouts of the messages left.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic view of the present invention.

DESCRIPTION OF THE PREFERRED EMBODIMENT

Figure 1:
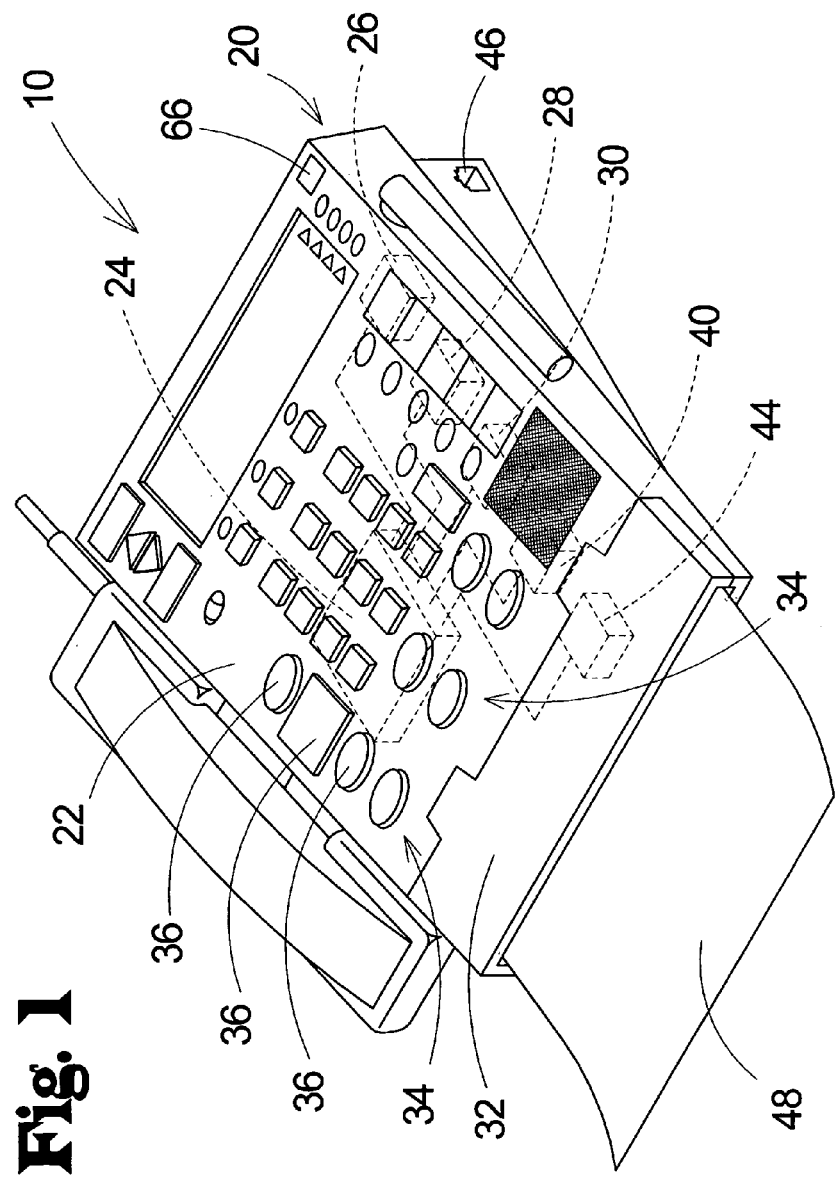
FIG. 1 is a perspective view of a new telephone message exporting system according to the present invention.
Figure 2:
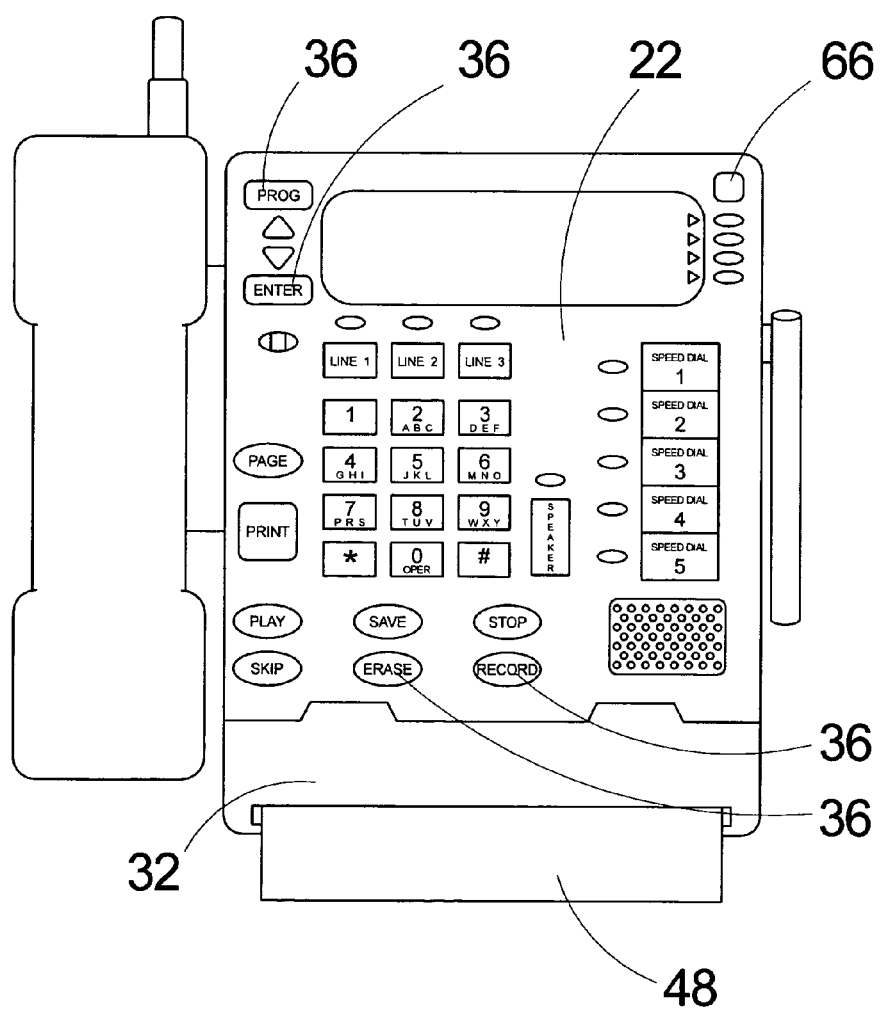
FIG. 2 is a front view of the present invention.

With reference now to the drawings, and in particular to FIGS. 1 through 3 thereof, a new telephone message exporting system embodying the principles and concepts of the present invention and generally designated by the reference numeral 10 will be described.

As best illustrated in FIGS. 1 through 3, the telephone message exporting system 10 generally comprises a telephone answering machine 20 having a main housing 22. A central processor 24 is positioned in the main housing 22. An outgoing message storage assembly 26 is positioned in the main housing 22 for storing an outgoing message to be played when the answering machine 20 responds to an incoming call. The outgoing message storage assembly 26 is operationally coupled to the central processor 24. An incoming message storage assembly 28 is positioned in the main housing 22 and operationally coupled to the central processor 24 for storing an incoming message from a caller as a stored audio message. A written translation program 30 is operationally coupled to the central processor 22 and the incoming message storage assembly 28 for translating the stored audio message into a written message. A printer 32 is positioned in the main housing 22 and operationally coupled to the central processor 24 for printing out the written message.

A user input means 34 is operationally coupled to the central processor 24 for controlling operational functions of the central processor 24. In an embodiment, the user input means comprises a plurality of operational keys 36 or buttons. Alternately, dials or word recognition software may be used to permit a user to input information to the central processor to perform the various functions of the invention as desired by the user. These functions include the ability to program the central processor 22 to cause automatic deletion of the stored audio message from the incoming message storage assembly upon printing of the written message translated from the stored audio message.

In an embodiment, a memo storage assembly 40 is operationally coupled to the central processor 22 for storing audio memoranda as a stored audio memo. In this embodiment, the written translation program 30 is operationally coupled to the central processor 22 and the memo storage assembly 40 for translating the stored audio memo into a written memo. The stored incoming messages may also be translated to writing in this embodiment as desired by the user.

Preferably, the collected messages and memos can be reviewed aurally and then selectively deleted or saved in the same fashion as currently existing answering machine systems. Printing of messages can be achieved for saved messages or current messages collected.

In an embodiment, an electronic form translation program 44 is operationally coupled to the central processor 22 and the incoming message storage assembly 28 for translating the stored audio message into an electronic data file for exporting to an electronic device. A data transfer port 46 is operationally coupled to the central processor 22 for facilitating exporting the electronic data file. The data transfer port 46 may be an infra-red data transfer port or a networking port for hard-wiring a connection to the invention.

Preferably, a paper supply 48 is coupled directly to or positioned substantially within the main housing 22 to provide paper to the printer of the invention. The paper supply 48 may employ a roll of paper or an input tray supplied with sheets of paper.

The telephone answering machine may further incorporate a telephone headset, cordless handset, speed dialing, speakerphone, multiple line features, dialing from memory, telephone charging capability, and other such features currently known and incorporated into telephones.

Except where they are mutually exclusive, the features described above may be combined in various combinations to form additional embodiments of the invention.

In use, the answering machine is connected to a telephone line to receive incoming messages. The messages are stored digitally in a form that is selectively output to the user in aural or written form depending on the preference of the user.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A telephone message exporting system comprising:
a telephone answering machine having a main housing;
a central processor positioned in said main housing;
outgoing message storage assembly positioned in said main housing for storing an outgoing message to be played when said answering machine responds to an incoming call, said outgoing message storage assembly being operationally coupled to said central processor;
an incoming message storage assembly positioned in said main housing and operationally coupled to said central processor for storing an incoming message as a stored audio message;
a written translation program operationally coupled to said central processor and said incoming message storage assembly for translating said stored audio message into a written message; and
a printer positioned in said main housing and operationally coupled to said central processor for printing out said written message;
wherein said central processing unit automatically deletes said stored audio message from said incoming message storage assembly upon printing of said written message translated from said stored audio message.

2. The telephone message exporting system of claim 1, further comprising:
a user input means operationally coupled to said central processor for controlling operational functions of said central processor.

3. The telephone message exporting system of claim 2 wherein said user input means comprises a plurality of operational keys.

4. The telephone message exporting system of claim 1, further comprising:
a memo storage assembly operationally coupled to said central processor for storing audio memoranda as a stored audio memo;

said written translation program being operationally coupled to said central processor and said memo storage assembly for translating said stored audio memo into a written memo.

5. The telephone message exporting system of claim 1, further comprising:
an electronic form translation program operationally coupled to said central processor and said incoming message storage assembly for translating said stored audio message into an electronic data file for exporting to an electronic device.

6. The telephone message exporting system of claim 5, further comprising:
a data transfer port operationally coupled to said central processor for facilitating exporting said electronic data file.

7. The telephone message exporting system of claim 6 wherein said data transfer port is an infra-red data transfer port.

8. The telephone message exporting system of claim 1, further comprising:
a paper supply positioned in said main housing.

9. A telephone message exporting system comprising:
a telephone answering machine having a main housing;
a central processor positioned in said main housing;
outgoing message storage assembly positioned in said main housing for storing an outgoing message to be played when said answering machine responds to an incoming call, said outgoing message storage assembly being operationally coupled to said central processor;
an incoming message storage assembly positioned in said main housing and operationally coupled to said central processor for storing an incoming message as a stored audio message;
a written translation program operationally coupled to said central processor and said incoming message storage assembly for translating said stored audio message into a written message;
a printer positioned in said main housing and operationally coupled to said central processor for printing out said written message;
a user input means operationally coupled to said central processor for controlling operational functions of said central processor;
wherein said user input means comprises a plurality of operational keys;
wherein said central processing unit automatically deletes said stored audio message from said incoming message storage assembly upon printing of said written message translated from said stored audio message;
a memo storage assembly operationally coupled to said central processor for storing audio memoranda as a stored audio memo;
said written translation program being operationally coupled to said central processor and said memo storage assembly for translating said stored audio memo into a written memo;
an electronic form translation program operationally coupled to said central processor and said incoming message storage assembly for translating said stored audio message into an electronic data file for exporting to an electronic device;
a data transfer port operationally coupled to said central processor for facilitating exporting said electronic data file;
wherein said data transfer port is an infra-red data transfer port; and a paper supply positioned in said main housing.

10. A telephone message exporting system comprising:
a telephone answering machine having a main housing;
a central processor positioned in said main housing;
outgoing message storage assembly positioned in said main housing for storing an outgoing message to be played when said answering machine responds to an incoming call, said outgoing message storage assembly being operationally coupled to said central processor;
an incoming message storage assembly positioned in said main housing and operationally coupled to said central processor for storing an incoming message as a stored audio message;
a written translation program operationally coupled to said central processor and said incoming message storage assembly for translating said stored audio message into a written message; and
a printer positioned in said main housing and operationally coupled to said central processor for printing out said written message;
wherein said central processing unit automatically deletes said stored audio message from said incoming message storage assembly upon printing of said written message translated from said stored audio message.

11. The telephone message exporting system of claim 10, further comprising:
a user input means operationally coupled to said central processor for controlling operational functions of said central processor.

12. The telephone message exporting system of claim 11 wherein said user input means comprises a plurality of operational keys.

13. The telephone message exporting system of claim 10, further comprising:
a memo storage assembly operationally coupled to said central processor for storing audio memoranda as a stored audio memo;
said written translation program being operationally coupled to said central processor and said memo storage assembly for translating said stored audio memo into a written memo.

14. The telephone message exporting system of claim 10, further comprising:
an electronic form translation program operationally coupled to said central processor and said incoming message storage assembly for translating said stored audio message into an electronic data file for exporting to an electronic device.

15. The telephone message exporting system of claim 14, further comprising:
a data transfer port operationally coupled to said central processor for facilitating exporting said electronic data file.

16. The telephone message exporting system of claim 15 wherein said data transfer port is an infra-red data transfer port.

17. The telephone message exporting system of claim 10, further comprising:
a paper supply positioned in said main housing.

* * * * *